Feb. 14, 1939.　　　　L. C. OREE ET AL　　　　2,146,978
MULTIPLE VALVED TIRE INFLATING DEVICE
Filed Oct. 28, 1937　　　2 Sheets-Sheet 1
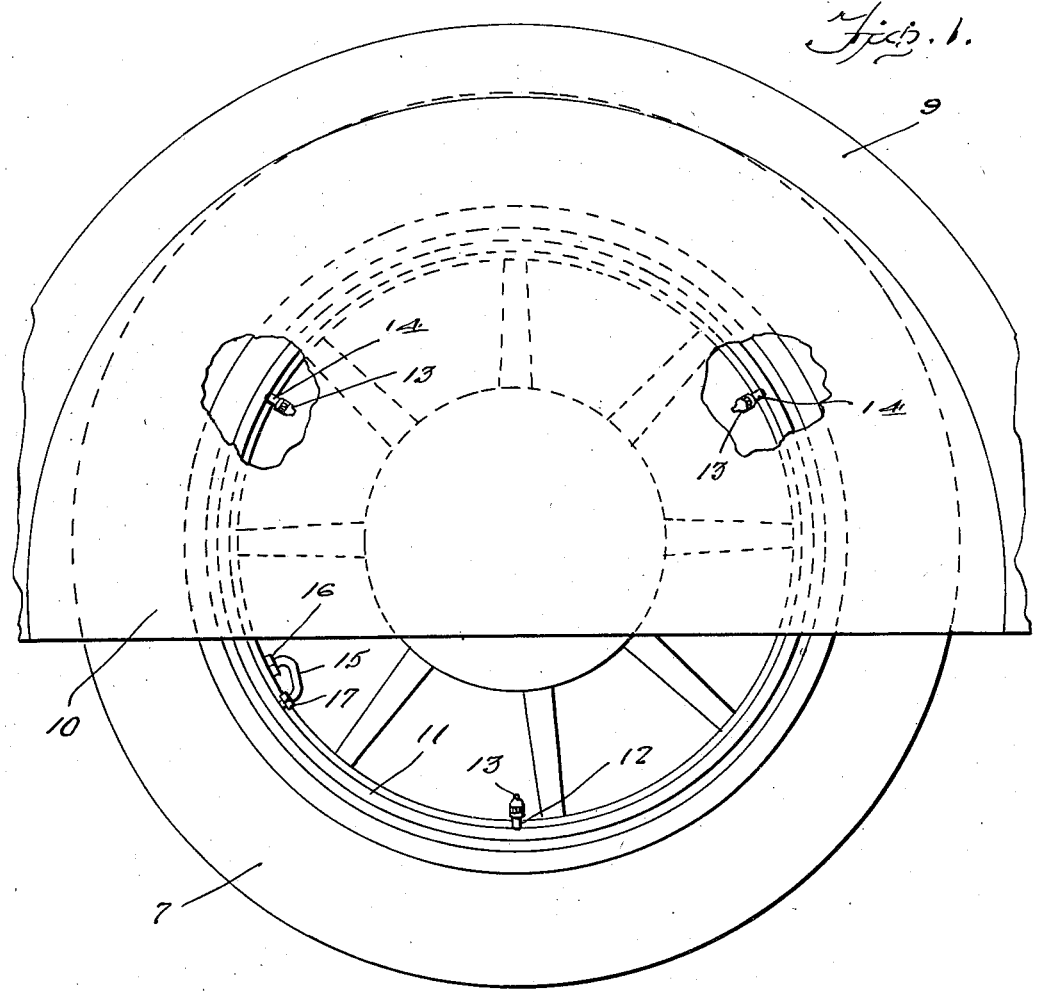
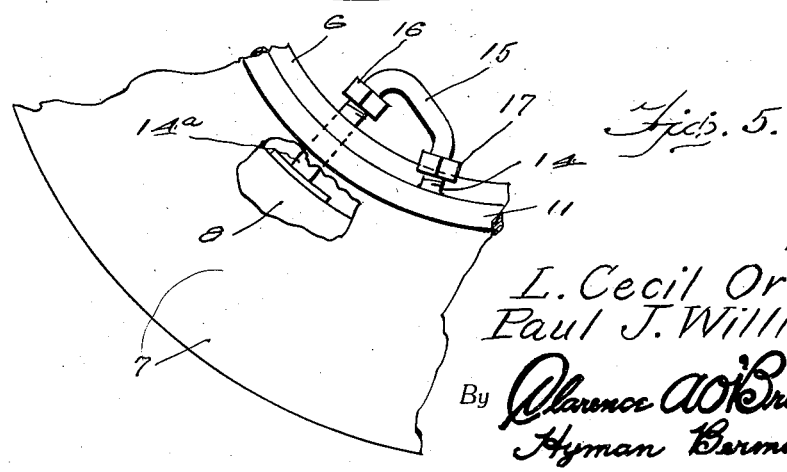
Inventors
L. Cecil Oree
Paul J. Williams
By Clarence A. O'Brien
Hyman Berman
Attorneys Feb. 14, 1939.  L. C. OREE ET AL  2,146,978
MULTIPLE VALVED TIRE INFLATING DEVICE
Filed Oct. 28, 1937   2 Sheets-Sheet 2
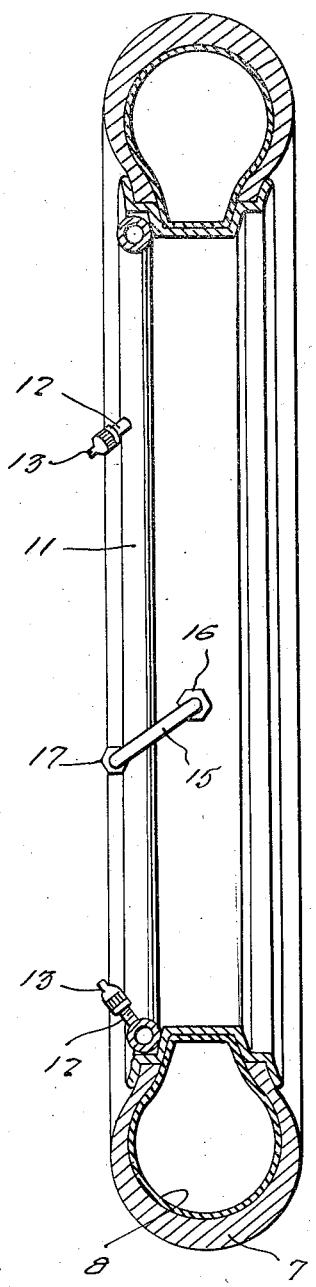
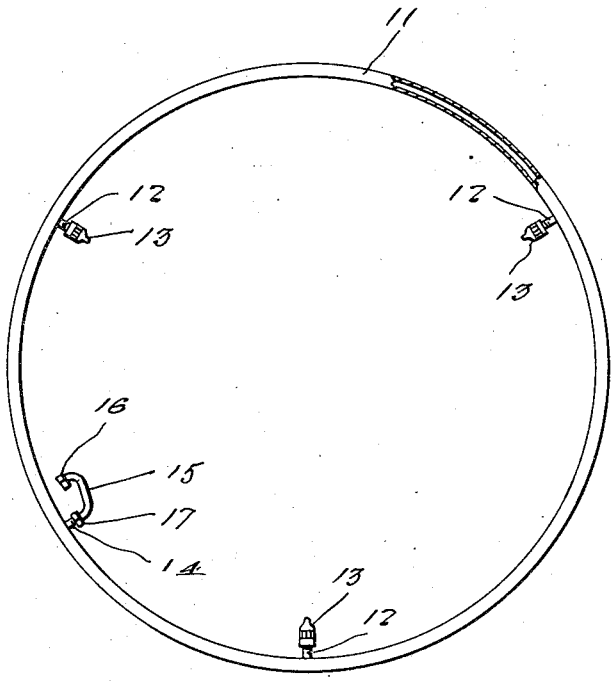
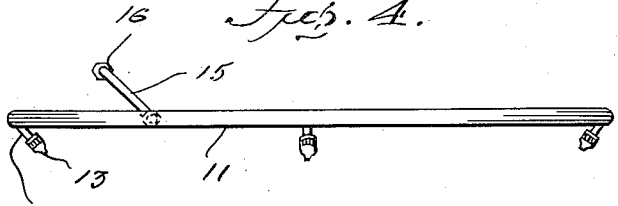
Inventors
L. Cecil Oree
Paul J. Williams
By Clarence A. O'Brien
Hyman Berman
Attorneys Patented Feb. 14, 1939

2,146,978

UNITED STATES PATENT OFFICE 2,146,978

MULTIPLE-VALVED TIRE INFLATING DEVICE

Lawrence Cecil Oree and Paul James Williams, Au Sable Forks, N. Y.

Application October 28, 1937, Serial No. 171,582

5 Claims. (Cl. 152—415)

This invention relates to novel means having a plurality of tire gauging and inflation valves co-operable with a conventional pneumatic tube to facilitate inflating as well as determining the pressure, and the purpose of the invention is to provide a handy device rendering at least one of the valves readily accessible at all times.

In many of the present day motor cars it is the practice to house or encase substantially the whole of the upper portion of the wheel in an ornamental shielding fender. This is especially true insofar as the rear wheels are concerned. Under the circumstances, the single tire valve, ordinarily employed, is not always readily available or accessible. As a matter of fact, it often becomes necessary to maneuver the car forward and backward in order to bring the valve into a position where the pump hose or a gauge can be conveniently utilized.

Confronted with these difficulties, we have conceived and perfected what we call a multiple valved air ring, and this is disposed on the exterior side of the vehicle wheel and provided with circumferentially spaced selectively usable tire valves for easy and ready use. The ring itself is coupled to the inner tube, whereby to permit the air to flow unobstructedly into the tube for inflation, and to at the same time, permit the pressure to be determined by any one of the aforesaid tire valves.

Other features and advantages will become more readily apparent from the following description and accompanying illustrative drawings.

In the drawings, wherein are used like numbers to designate like mechanical parts throughout the views:

Figure 1 is a side elevation of a rear fender and wheel assembly disclosing the improved multiple valved air ring in its operative position.

Figure 2 is a vertical sectional view illustrating the construction and arrangement to better advantage.

Figure 3 is a view of the ring itself, a portion thereof being shown in section.

Figure 4 is an edge view of the unit seen in Figure 3.

Figure 5 is a fragmentary elevational view detailing the communicating coupling or connection between the inner tube and air distributing ring.

Referring now to the drawings by distinguishing reference numerals it will be observed that the wheel rim is denoted by the numeral 6, the tire casing at 7 and the inner tube at 8. As seen in Figure 1 a conventional fender of the full fashioned type is indicated at 9 and provided with an ornamental drop plate 10. In most instances, while this shield or plate 10 is bodily detachable, it is not desirable to remove it each and every time one desires to inflate the tires. Hence, as before indicated, it almost invariably happens that when air is desired, the only available and single tire valve is hooded under the shield and therefore not accessible. In order to bring the valve down close to the surface, or at least to a point below the shield, some maneuvering of the car is necessary. Consequently, as before stated, we have evolved the device seen in Figures 3 and 4 as an accessory or attachment whereby to render available one of a number of selectively usable tire valves to facilitate taking pressures or charging tires with air, as the case may be.

The attachment device has already been referred to as a ring and in reality is in the form of an annular endless tube. This part of the device is denoted by the numeral 11 and may be of any suitable dimensions and cross sectional shape. Generally, it is cylindrical in cross sectional form and made of light weight metal which may be externally chromium plated or otherwise finished, to harmonize with the wheel with which it is associated. The ring is of a diameter about equal to the inner diameter of the rim of the car wheel as shown in Figure 2. It is suitably fastened in place. At substantially equi-distant circumferentially spaced points, it is provided with what may be called conventional tire valves 12 these being provided with removable protective enclosing caps 13. Manifestly, these selectively usable individual valves are provided with customary valve inserts or linings (not shown). The nipple 14 is however, not valved. By the same token, the companion air inlet or intake nipple 14a on the inner tube (see Figure 5) is also non-valved. These two nipples are in intercommunicating coupled connection by way of a substantially U-shaped coupling 15, this having jointing nuts 16 and 17 at opposite ends for the convenience of assembly. It is to be observed that the U-shaped coupling 15 serves not only as a means for operatively joining the annulus or ring 11 with the nipple 14a, but further functions as the single source of communicating connection between said annulus and inner tube 8. It should be noted that there is no valve in this U-coupling 15 therefore it permits the air to enter the inner tube and also permits the air to flow back from the inner tube into the annulus so that the pressure can be checked from any one of the valves 13.

With a device constructed and disposed in place as indicated in the drawings, it is evident that one of the three selectively usable valves 12 is invariably in a "down" position, that is, disposed on a plane below the lower edge of the shield 10, where it is conveniently accessible for inflation as well as gauging purposes. Consequently, it is believed that this device fulfills a long felt need for efficient and handy means serving as a time and labor saver, as well as an accessory aptly fitted for the purposes intended.

The drawings are purely illustrative of the preferred concept of the invention. Whereas, for example, the air ring or annulus is shown to be adjoined to the tire rim and disposed externally so to speak, it is evident that it could be incorporated as an integral part or passage in the rim. Moreover, it could be completely housed on the interior of the rim with the extra tire valves projecting through the rim to render them available. We desire that this be understood in determining the scope of the protection accorded by the claims.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

We claim:

1. In a construction of the class described, in combination, a vehicle wheel including a pneumatic tire having a pneumatic tube provided with a non-valved air inlet nipple, an annular conduit mounted on the wheel and in communication with said nipple and selectively usable tire gauging and inflation valves carried by said conduit.

2. As a new article of manufacture, an endless tubular ring provided at a predetermined point with a non-valved nipple, coupling means attached to said nipple and adapted for connection with an inner tube, and a plurality of equi-distant circumferentially spaced valved nipples carried by the inner peripheral portion of said ring as described.

3. In a structure of the character described, a vehicle wheel including a rim, a pneumatic tire including a casing and inner tube, said inner tube being provided with the single conventional air intake and exhaust nipple, said nipple being non-valved, a rigid air distributing ring attached to said rim, said ring being provided at a predetermined point with a threaded nipple, a U-coupling having jointing nuts at opposite ends connected with said nipple to provide a continuously unobstructed communication between the ring and inner tube, and a plurality of circumferentially spaced selectively usable tire valves on said ring.

4. In a structure of the class described, a vehicle wheel including a rim, a pneumatic tire on said rim including a casing and associated conventional inner tube, said inner tube having the customary single air discharge and intake nipple, said nipple being non-valved and extending inwardly through and beyond the inner peripheral surface portion of said rim, an air ring nested in and mounted on said rim, a constant communicating air connection between the ring and nipple, and a series of three or more circumferentially spaced selectively usable tire valves carried by said air ring.

5. As a new article of manufacture, an attachment for a vehicle wheel rim comprising an endless tubular air ring for inflation, gaging and distributing purposes provided at a predetermined point with a non-valved air return and delivery nipple, a U-shaped coupling, said coupling having means at opposite ends for detachable connection with said nipple, and a complemental nipple on a conventional inner tube to provide operating connection between the air ring and inner tube, and a plurality of equi-distant circumferentially spaced valved pumping and air release engaging nipples mounted on said air ring in spaced relation to said first-named nipple.

LAWRENCE CECIL OREE.
PAUL JAMES WILLIAMS.